US008027368B2

(12) United States Patent
Lee et al.

(10) Patent No.: US 8,027,368 B2
(45) Date of Patent: Sep. 27, 2011

(54) TERMINAL IN WIRELESS COMMUNICATION SYSTEM AND RANGING METHOD FOR DYNAMICALLY CHANGING RANGING PERIOD THEREOF

(75) Inventors: Nam-Suk Lee, Cheollabuk-do (KR); Nam-Hoon Park, Daejeon (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd, Seoul (KR); KTFreetel Co., Ltd., Seoul (KR); Hanaro Telecom, Inc., Seoul (KR)

( * ) Notice: Subject to any disclaimer, the term of this patent is extended or adjusted under 35 U.S.C. 154(b) by 477 days.

(21) Appl. No.: 11/720,923

(22) PCT Filed: Sep. 7, 2005

(86) PCT No.: PCT/KR2005/002961
§ 371 (c)(1),
(2), (4) Date: Oct. 13, 2009

(87) PCT Pub. No.: WO2006/062285
PCT Pub. Date: Jun. 15, 2006

(65) Prior Publication Data
US 2010/0027462 A1 Feb. 4, 2010

(30) Foreign Application Priority Data
Dec. 7, 2004 (KR) .................. 10-2004-0102400

(51) Int. Cl.
*H04J 3/06* (2006.01)
(52) U.S. Cl. .................. 370/508; 370/278; 370/324

(58) Field of Classification Search .................. 370/278, 370/324, 508
See application file for complete search history.

(56) References Cited

U.S. PATENT DOCUMENTS

| 2003/0198179 A1 | 10/2003 | Koo et al. |
| 2005/0041573 A1* | 2/2005 | Eom et al. ..................... 370/208 |
| 2007/0032255 A1* | 2/2007 | Koo et al. ..................... 455/512 |
| 2007/0274265 A1* | 11/2007 | Yoon et al. ..................... 370/335 |
| 2008/0305822 A1* | 12/2008 | Li et al. ......................... 455/522 |

FOREIGN PATENT DOCUMENTS

| KR | 1020030084243 A | 1/2003 |
| KR | 1020030064219 A | 7/2003 |

OTHER PUBLICATIONS

Eklund et al., IEEE Standard 802.16; A Technical Overview of the WirelessMAN™ Air Interface for Broadband Wireless Access, vol. 40, No. 6, Jun. 2002, Jun. 4, 2002, pp. 98-107, XP 011092870.

* cited by examiner

*Primary Examiner* — Jason Mattis
(74) *Attorney, Agent, or Firm* — Jefferson IP Law, LLP

(57) ABSTRACT

A ranging method of an access terminal that requests a ranging to an access point through a wireless network and performs the ranging, the ranging method including a) initializing a ranging period, b) setting a timer with the ranging period and starting the timer, c) requesting a ranging by transmitting a given ranging code to the access point based on radio resource allocation information provided by the access point, d) receiving a ranging response message from the access point, and controlling transmission power, timing, and frequency offset of an access terminal according to transmission parameters included in the received ranging response message, e) estimating a downlink channel condition through which a signal from the access point is transmitted, f) resetting the ranging period according to the estimated downlink channel condition, and g) iteratively performing b) to f) according to the reset ranging period.

12 Claims, 10 Drawing Sheets

[Fig. 1]
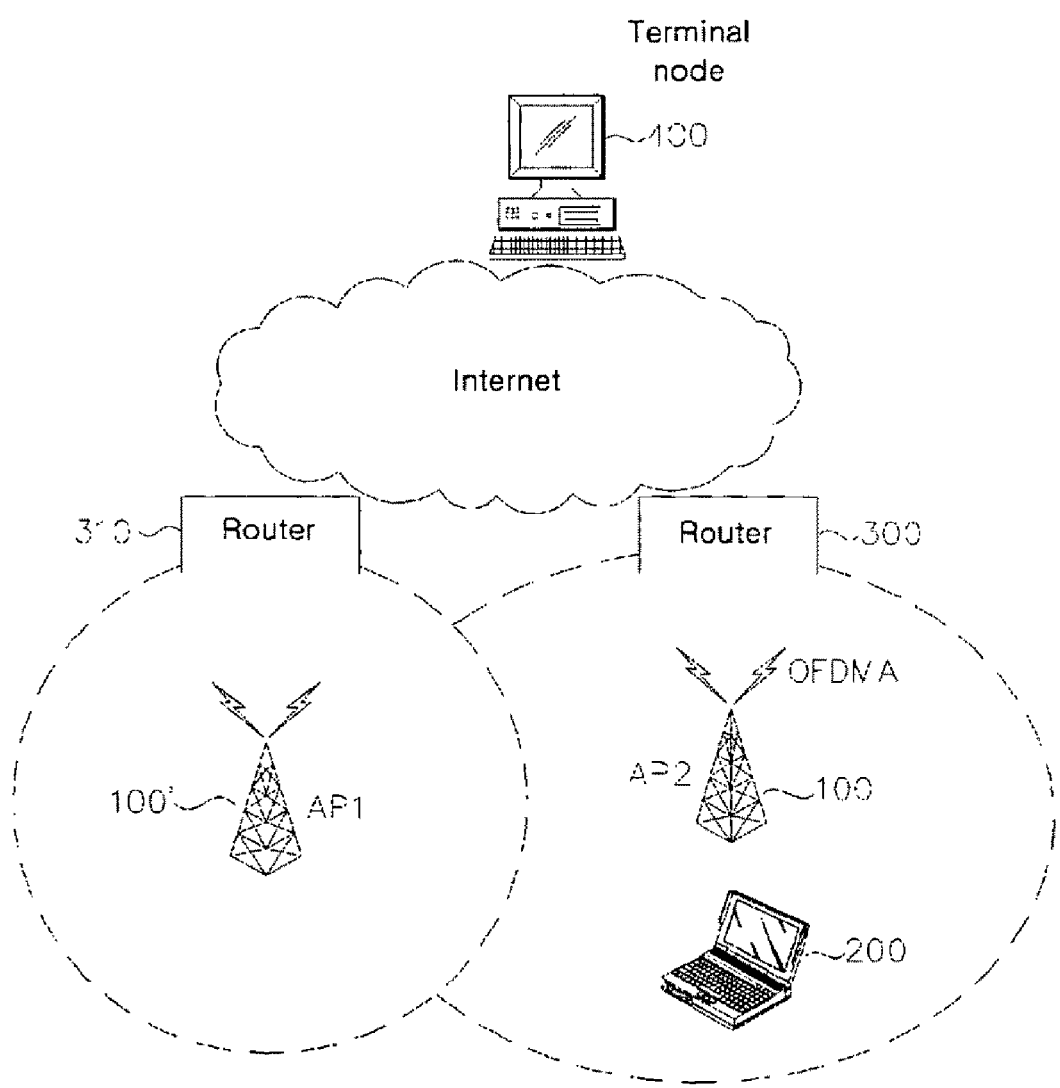

[Fig. 2]
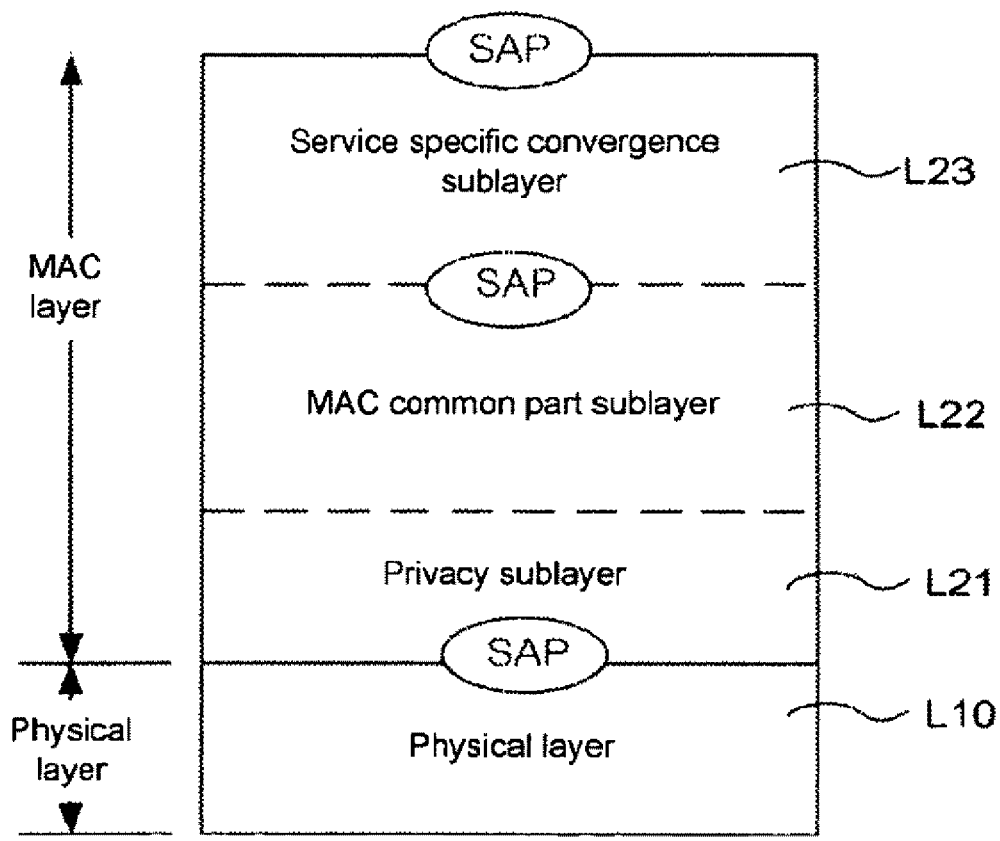

[Fig. 3]
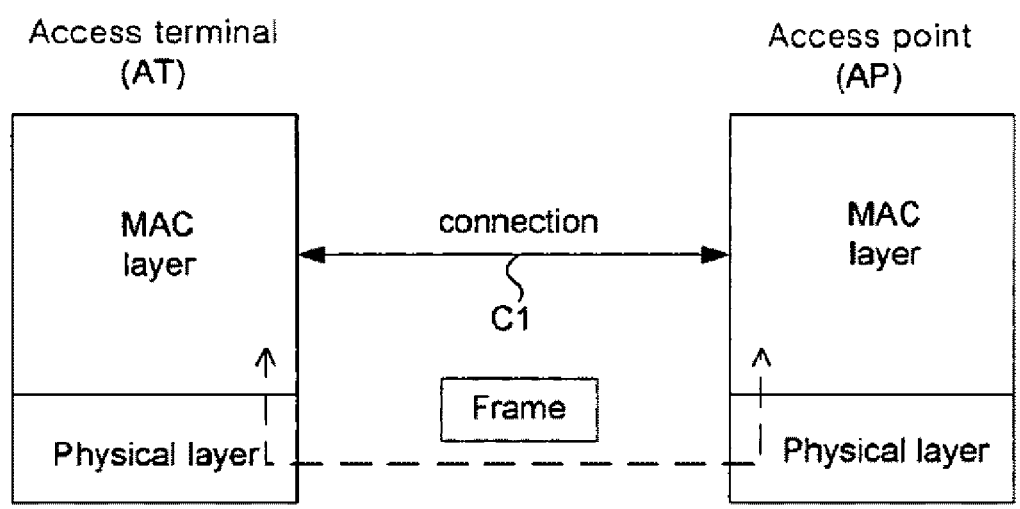

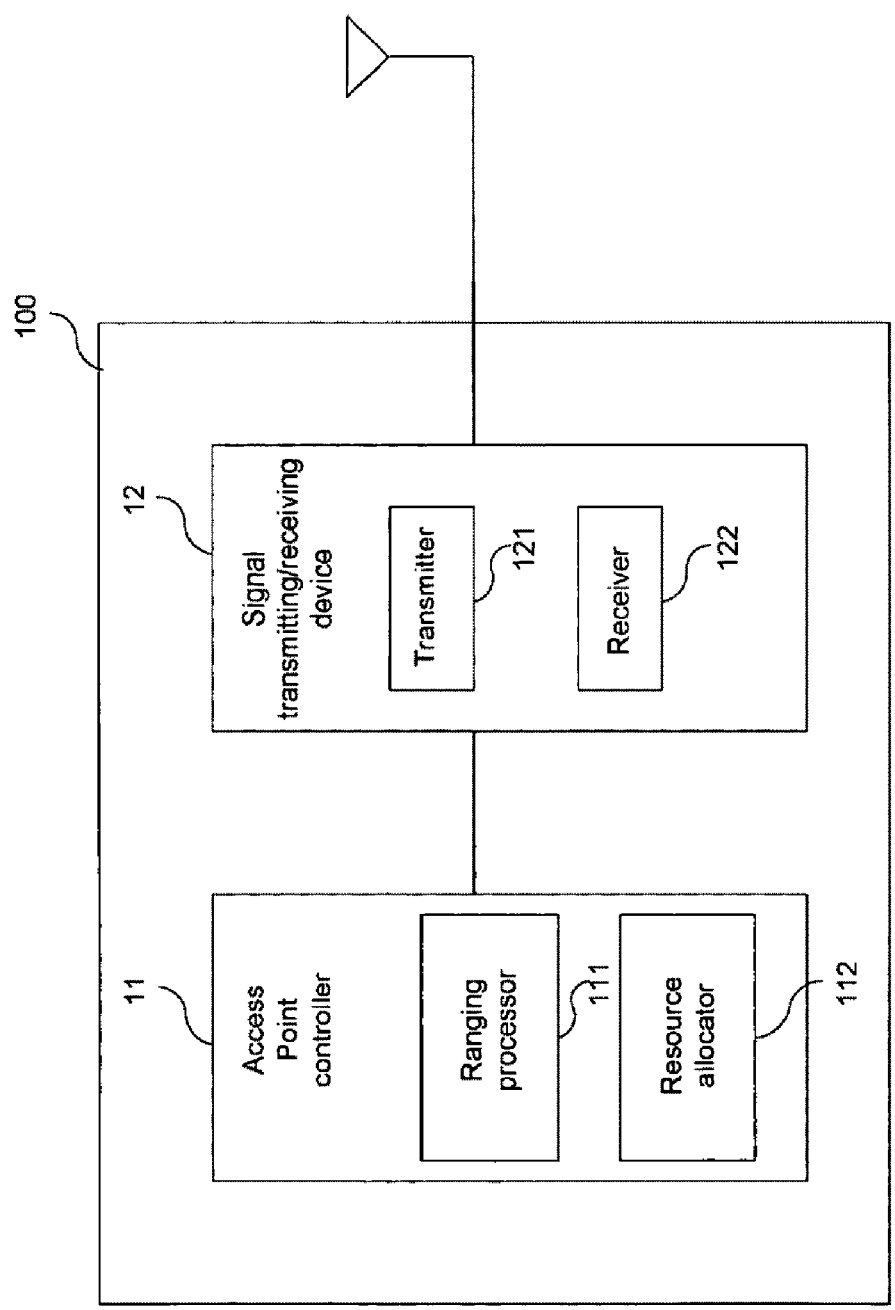
[Fig. 4]

[Fig. 5]
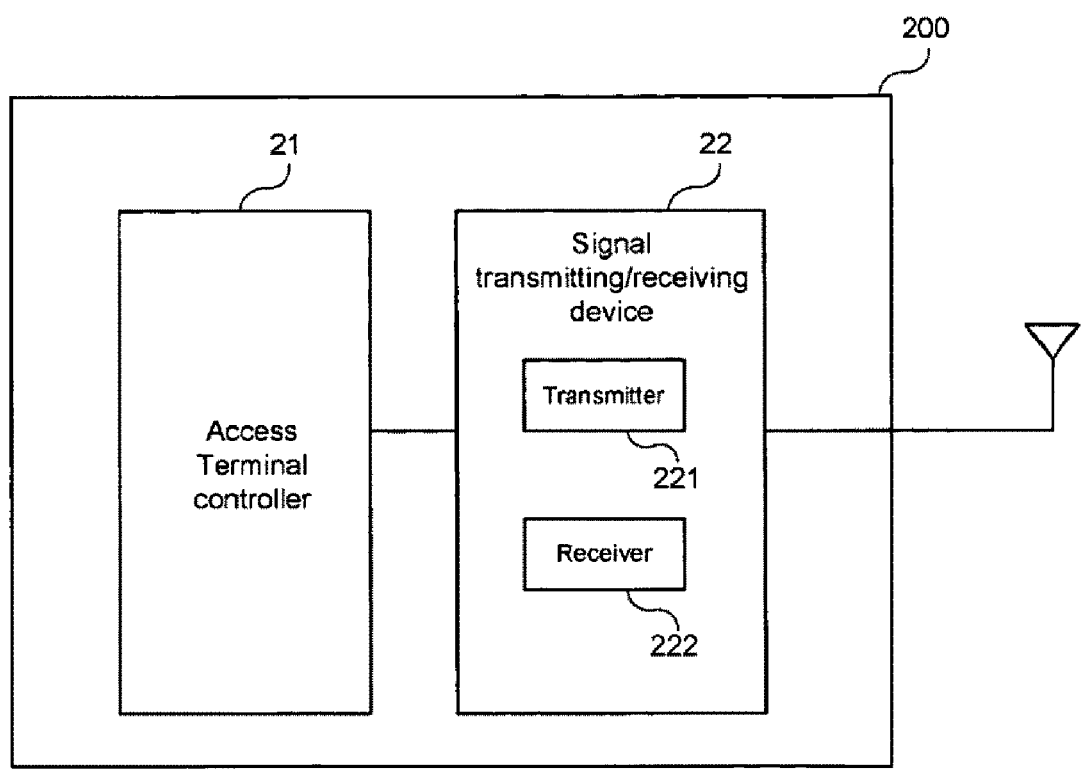

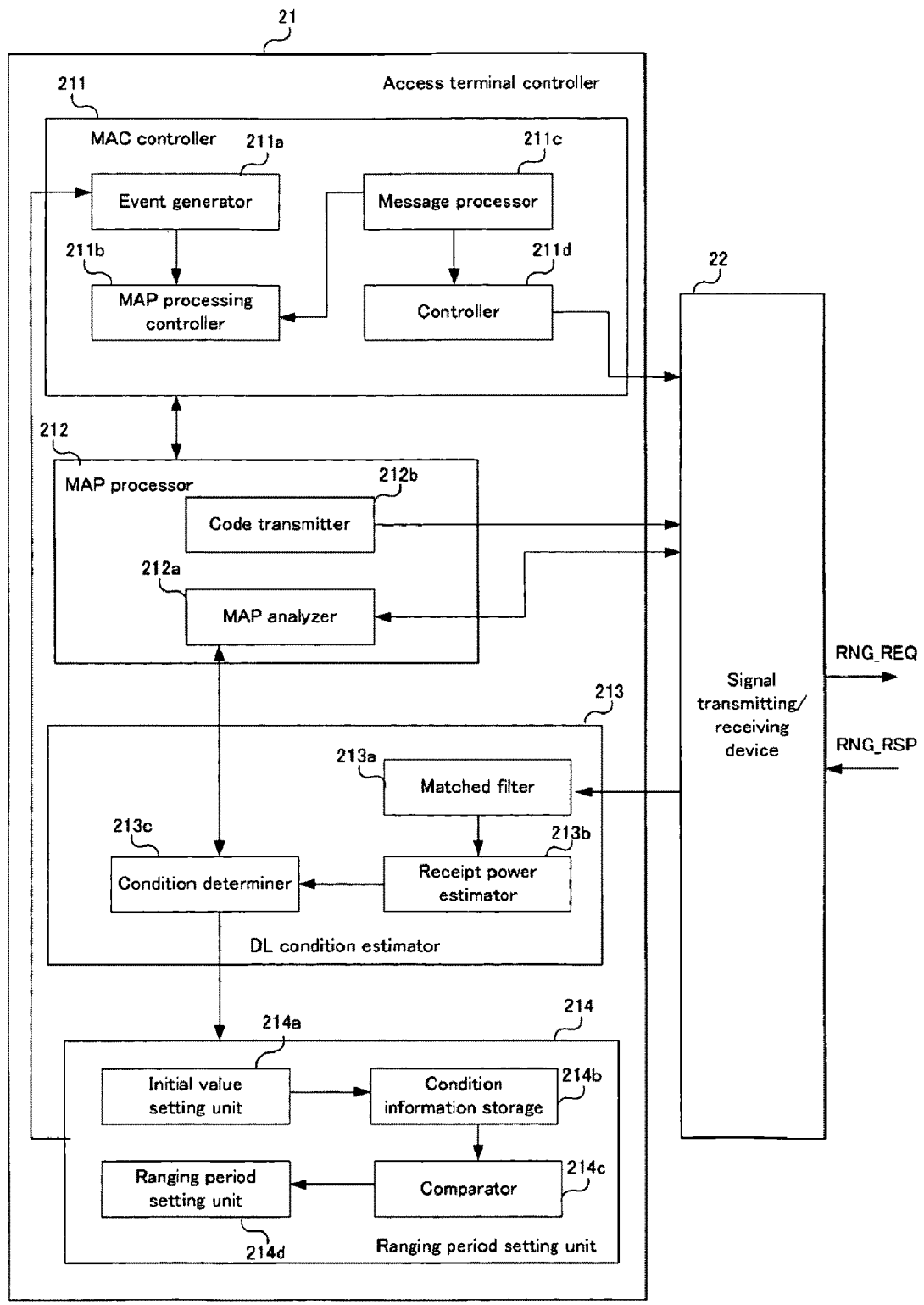
[Fig. 6]

[Fig. 7]
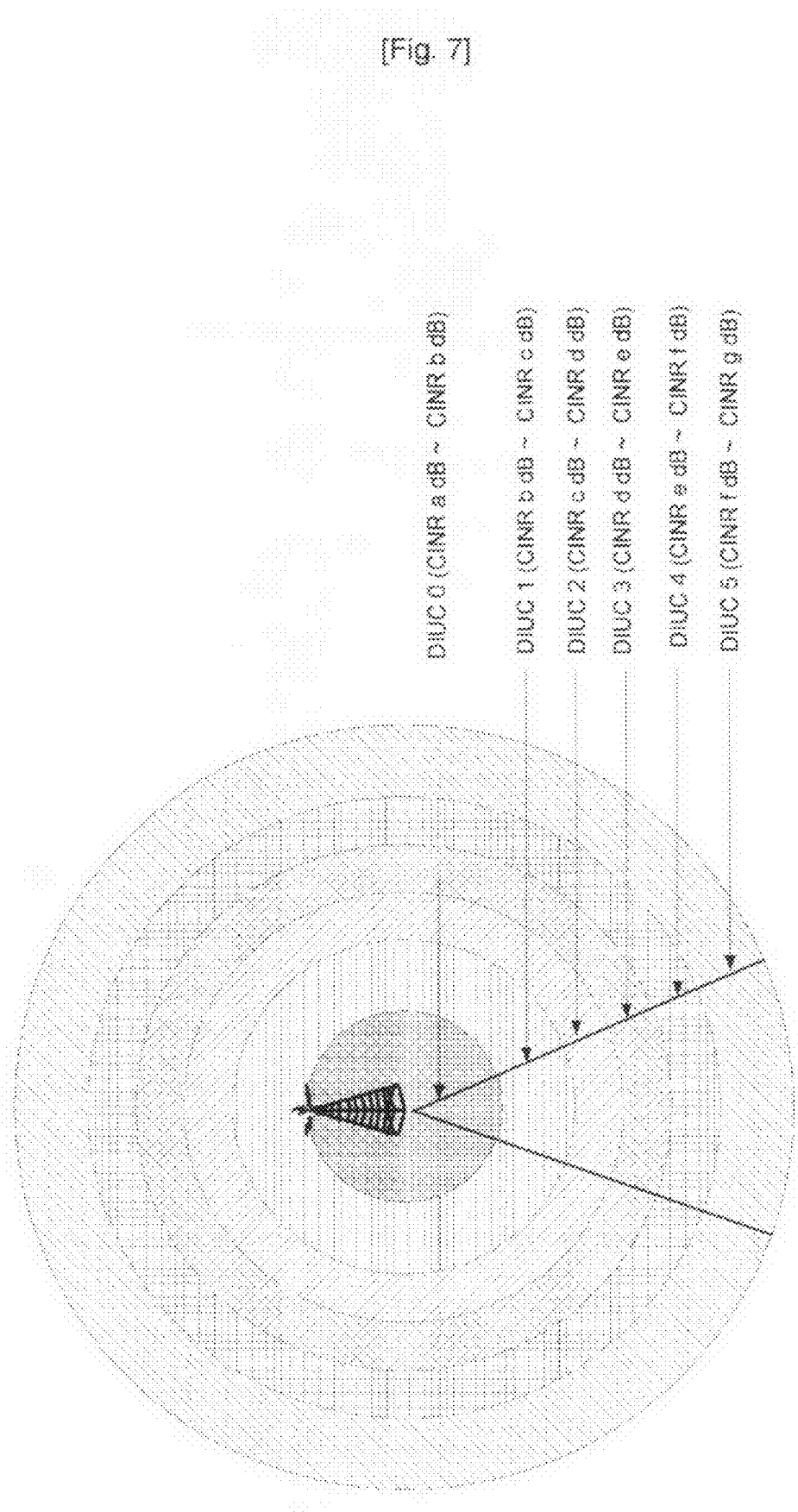

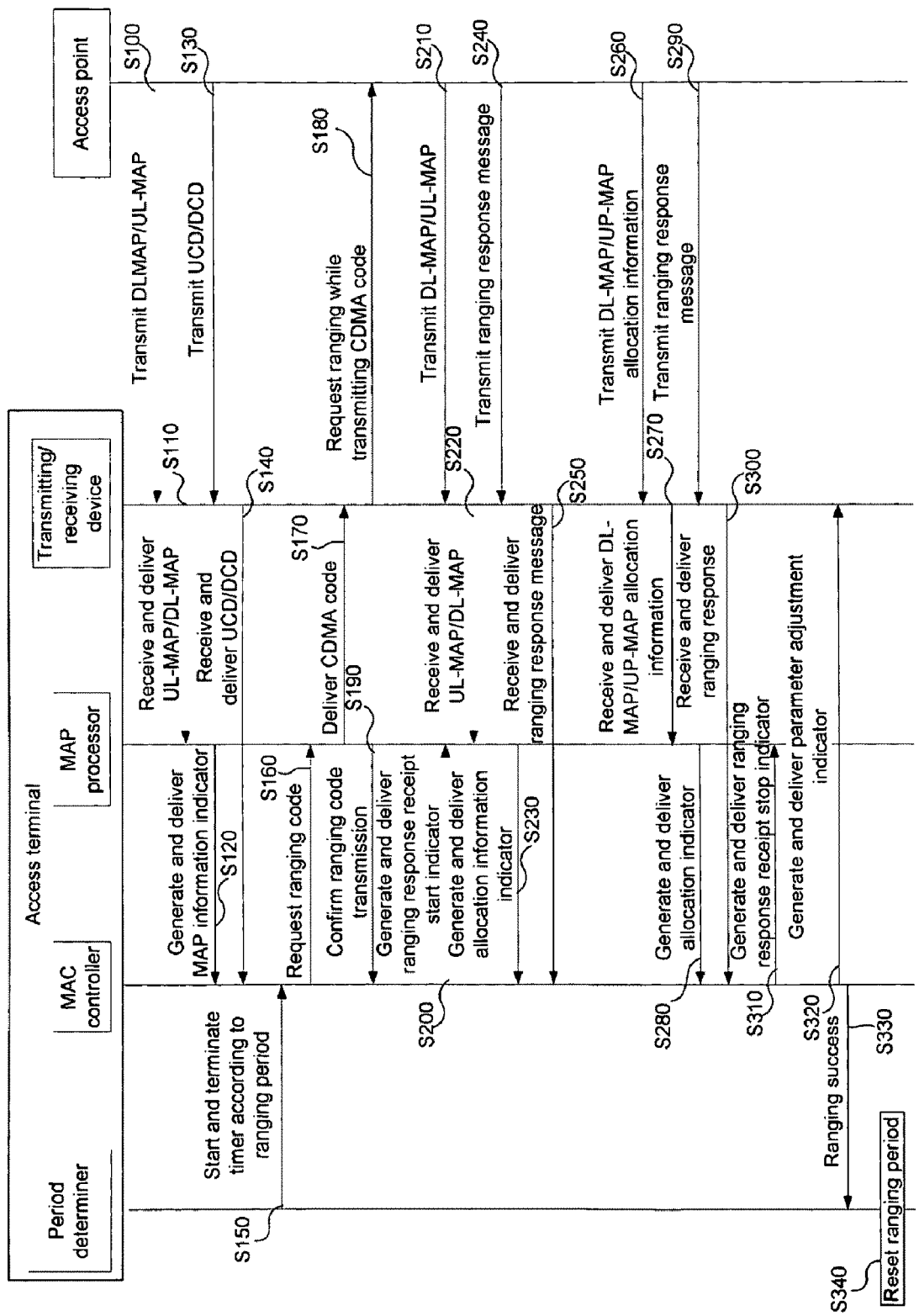
[Fig. 8]

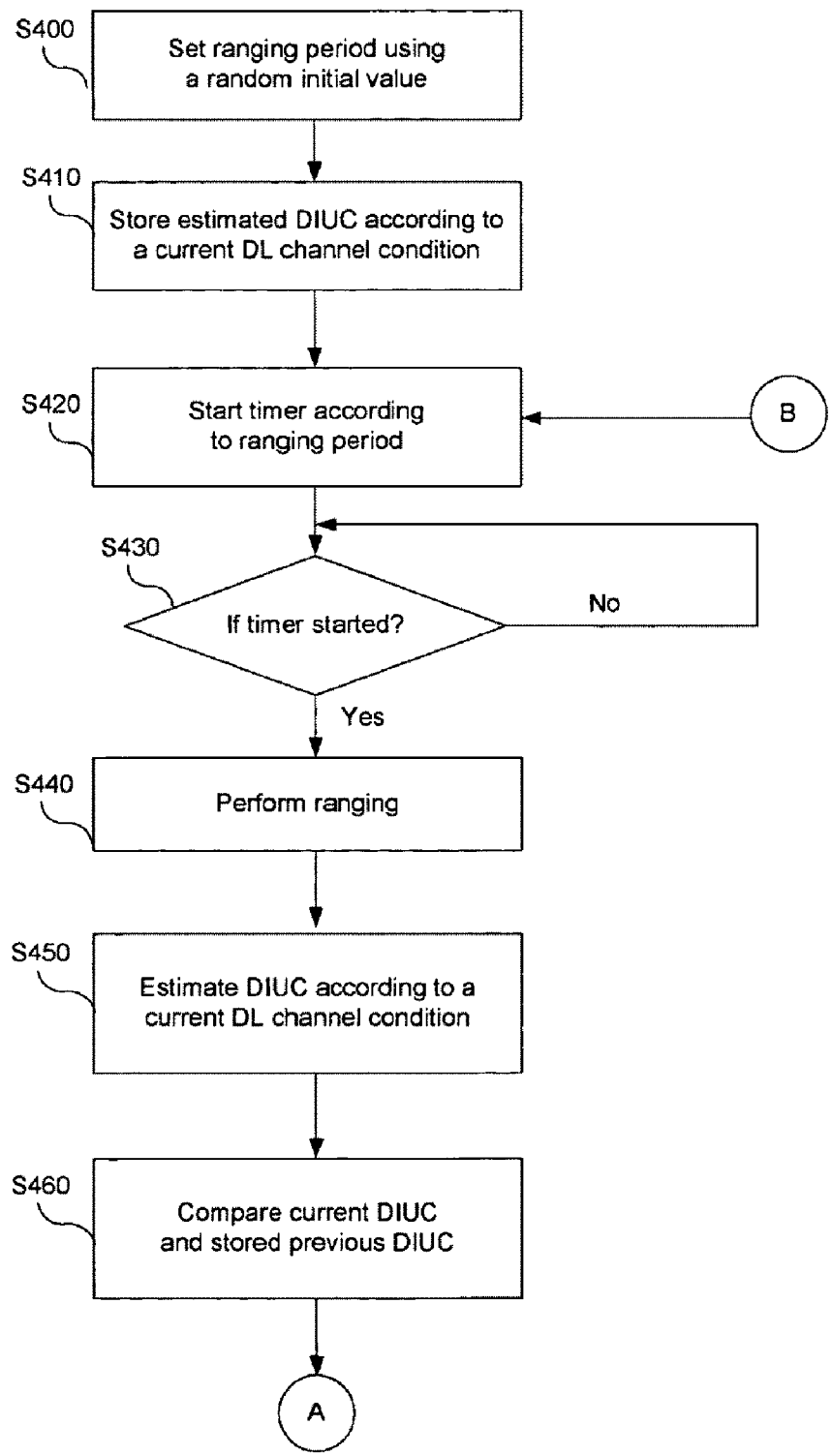
[Fig. 9]

[Fig. 10]
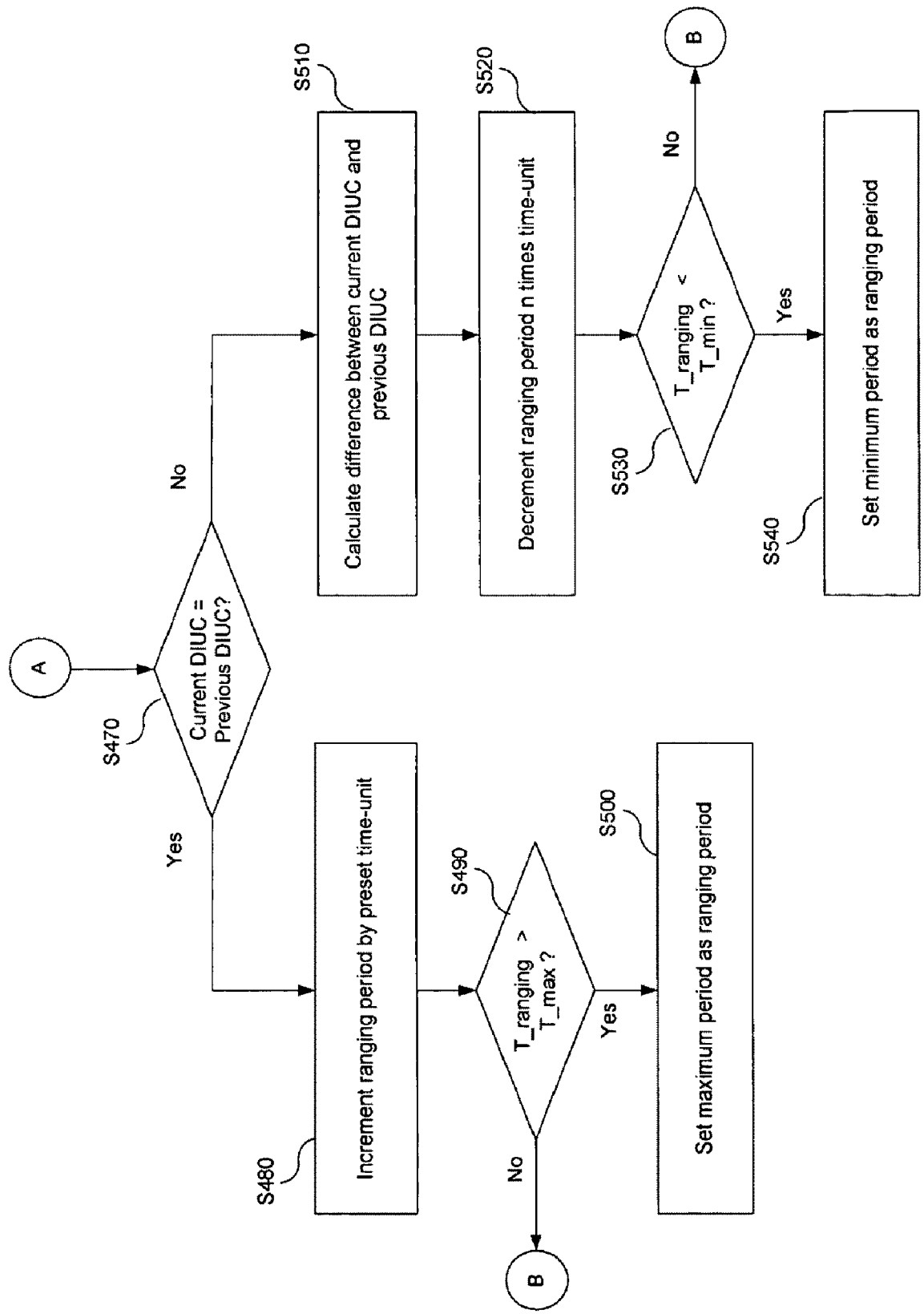

TERMINAL IN WIRELESS COMMUNICATION SYSTEM AND RANGING METHOD FOR DYNAMICALLY CHANGING RANGING PERIOD THEREOF

TECHNICAL FIELD

The present invention relates to a wireless communication system, and more particularly, it relates to an access terminal of a wireless portable Internet system and a method for dynamically changing a ranging thereof.

BACKGROUND ART

In a wireless communication system, wireless portable Internet is a next-generation communication system that supports mobility and local area data communication, such as in a conventional wireless local access network (LAN) that uses a fixed access point.

In such a wireless portable Internet system, a mobile access terminal (AT) requires a ranging to access an access point (AP). The ranging in a wireless portable Internet system is a function that controls transmission power, timing, and frequency offset of an uplink so that the AP can receive accurate data from the AT. When the AT periodically transmits Code Division Multiple Access (CDMA) codes to the AP, and the AP receives the CDMA codes, estimates transmission parameters (transmission power, timing, and frequency offset), controls the transmission parameters to be within a range set for receiving accurate data, and transmits the controlled transmission parameters to the AT.

In more detail, a ranging process is divided into an initial ranging and a controlling ranging. During the initial ranging, the AT selects a resource from among uplink resources provided by the AP and initially accesses the AP by transmitting a CDMA code assigned to the AT to the AP through the selected resource. During the controlling stage, the AT periodically performs receiving and processing a ranging response (RNG_RSP) message transmitted from the AP that has received the CDMA code and controlling transmission parameters of the uplink. In general, the controlling ranging is performed at predetermined intervals to periodically control transmission parameters so that the AP receives data from the mobile AT with accuracy even though a wireless data communication environment dynamically changes as the AP moves from one area to another.

However, a conventional ranging is performed at fixed intervals without considering changes of the wireless data communication environment, and thus it is difficult to control transmission parameters when the AT moves vary fast. Moreover, since the ranging is performed at fixed intervals when the AT is fixed, CDMA codes transmitted from different ATs may be collided with each other in a contention-based CDMA code transmission, thereby causing degradation of a wireless communication system.

DISCLOSURE OF INVENTION

Technical Problem

Accordingly, the present invention is purposed to realize an efficient ranging by dynamically changing a ranging period of an access terminal according to changed radio environments in a wireless communication system.

Technical Solution

In one aspect of the present invention, a ranging method of an access terminal that requests a ranging from an access point through a wireless network and performs the ranging according to a response of the access point, the ranging method includes a) initializing a ranging period; b) setting a timer with the ranging period and starting the timer; c) requesting a ranging by transmitting a given ranging code from the access point based on radio resource allocation information provided by the access point when the timer is terminated and thus the ranging period has passed; d) receiving a ranging response message from the access point, and controlling transmission power, timing, and frequency offset of an access terminal according to transmission parameters included in the received ranging response message; e) estimating a downlink channel condition through which a signal from the access point is transmitted; f) resetting the ranging period according to the estimated downlink channel condition; and g) iteratively performing from b) to f) according to the reset ranging period.

In another aspect of the present invention, an access terminal requesting a ranging from an access point through a wireless network, and performing the ranging according to a response of the access point, the access terminal includes a transmitting/receiving device transmitting/receiving a signal to/from the access point through the wireless network; a ranging request and response processor requesting ranging by transmitting a ranging code from the access point through the transmitting/receiving device, and controlling at least one of transmission power, timing, and frequency offset of an uplink of the access terminal based on transmission parameters included in a ranging response message transmitted from the access point in response to the request; a downlink condition estimator estimating a condition of a downlink channel based on the signal transmitted from the access point; and a ranging period setting unit resetting a ranging period based on the estimated condition of the downlink channel, wherein the ranging request and response processor requests a ranging from an access point according to the reset ranging period.

Advantageous Effects

According to embodiments of the present invention, a ranging process of an access terminal may be efficiently realized in a wireless portable Internet system.

In addition, by dynamically controlling a periodic ranging time of the access terminal in a wireless communication system, errors occurring when an access terminal receives UL data may be reduced since transmission power, timing, and frequency offset may be controlled in accordance with a DL channel condition even though the access terminal rapidly moves.

BRIEF DESCRIPTION OF THE DRAWINGS

FIG. 1 is a schematic diagram illustrating an outline of a wireless portable Internet system according to an embodiment of the present invention.

FIG. 2 is a hierarchy chart showing a hierarchical structure of a wireless portable Internet system.

FIG. 3 is a schematic diagram showing a connection structure between an access point and an access terminal in the wireless portable Internet system.

FIG. 4 shows a structure of an access point according to an embodiment of the present invention.

FIG. 5 shows a structure of an access terminal according to an embodiment of the present invention.

FIG. 6 shows a structure of an access terminal controller of FIG. 5.

FIG. 7 exemplary shows a value of downlink interval usage code (DIUC) according to a range of a carrier to interference and noise ratio (CINR) that belongs to a downlink channel descriptor (DCD) from the access point.

FIG. 8 shows a ranging process according to an embodiment of the present invention.

FIG. 9 and FIG. 10 are flow charts illustrating a process of setting a ranging period according to an embodiment of the present invention.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive.

A condition of a downlink channel is estimated and a ranging period is dynamically changed based on the condition according to an embodiment of the present invention. In particular, a downlink channel condition is similar to an uplink channel condition in a Time Division Duplex (MD)-based wireless communication system. Thus, a change in the downlink channel condition is estimated according to movement of the access terminal, and the ranging period is dynamically changed based on the change in the condition to thereby control transmission parameters of the uplink.

The following embodiments of the present invention mainly focus on a ranging process performed by an access terminal in a wireless portable Internet system, but it should be understood that the present invention is not limited thereto.

FIG. 1 schematically illustrates a structure of a wireless portable Internet system according to an embodiment of the present invention.

A wireless portable Internet system includes access points (APs) 100 and 100' as base stations, an access terminal (AT) 200 wirelessly accessing the APs, routers 300 and 310 accessing the APs through a gateway, and an Internet.

The wireless portable Internet system supports mobility of the AT 200 to provide a seamless data communication service when it moves from one cell covered by a first access point AP2 (100) to another cell covered by a second access point AP1 (100'), supports a handover, and allocates dynamic IP addresses as the AT 200 moves.

FIG. 2 is a hierarchical view illustrating a hierarchical structure of a wireless portable Internet system according to an embodiment of the present invention.

A hierarchical structure of the IEEE 802.16e wireless portable Internet system includes a physical layer L10, and medium access control (MAC) layers L21, L22, and L23. The physical layer L10 performs wireless communication functions including modulation/demodulation and coding/decoding. According to the IEEE 802.16e, the wireless portable Internet system does not have function-specific MAC layers as does a wired Internet system, but a single MAC layer is in charge of different functions. The MAC layer includes a privacy sub-layer L21, a MAC common part sub-layer L22, and a service specific convergence sub-layer L23.

The service specific convergence sub-layer L23 performs payload header suppression and quality of service (QoS) mapping functions in consecutive data communication.

The MAC common part sub-layer L22 is the core of the MAC layer which is in charge of system access, bandwidth allocation, connection establishment and maintenance, and QoS control.

The privacy sub-layer L21 performs functions of equipment authentication and security key exchange, and encryption. The equipment authentication is carried out by the privacy sub-layer L21, but user authentication is carried out by an upper layer of the MAC (not shown).

FIG. 3 shows a schematic diagram of a connection structure between an AP and an AT in the wireless portable Internet system.

A connection is provided between the MAC layers of the AT and the AP. The term "connection C1" as used herein does not refer to a physical connection, but to a logical connection that is defined as a mapping relationship between the MAC peers of the AT and the AP for traffic transmission of one service flow. Hence, the parameter/message defined in the connection C1 refers to a function executed between the MAC peers. Actually, the parameter/message is processed into a frame, which is transferred through the physical layer and analyzed so as to control the MAC layer to execute a function corresponding to the parameter/message. A MAC message transferred through the connection C1 includes a connection identifier (CID), a UL_MAP and a DL_MAP, and channel descriptors. The connection identifier (CID) is a MAC layer address for identifying the connection, and the UL_MAP and DL_MAP are for identifying a symbol offset and a sub-channel of a burst time-divided by an AT in a downlink/uplink, and they define a number of symbols of the allocated resource and a number of sub-channels. The channel descriptors include a downlink channel descriptor (DCD) and an uplink channel descriptor (UCD) and are for describing a characteristic of a physical layer according to characteristics of the downlink/uplink. In addition, the MAC message includes various messages for performing request (REQ), response (RSP), and acknowledgement (ACK) for various operations.

FIG. 4 illustrates an AP that receives and processes a ranging request from an AT (or, a terminal), and responds to the request in the above-structured wireless portable Internet system. An AP 100 includes an access point controller 11 and a signal transmitting/receiving device 12 as shown in FIG. 4.

The access point controller 11 includes a ranging processor 111 performing a CDMA code ranging process for call access, and a resource allocator 112 managing a resource for each access terminal.

The ranging processor 111 controls timing, transmission power, and frequency offset of an AT 200 from which the CDMA code is transmitted for the ranging process, and transmits associated information by using a ranging response (RNG_RSP) message.

The resource allocator 112 manages uplink and downlink radio resources for access, and provides a UL-MAP/DL-MAP and uplink/downlink channel descriptors (UDC/CDC) to the AT 200.

The signal transmitting/receiving device 12 may include a transmitter 121 and a receiver 122 that selectively perform transmitting and receiving functions. The receiver 122 receives CDMA codes for a ranging process from a plurality of ATs and transmits the CDMA codes to the access point controller 11.

The transmitter 121 modulates/demodulates a RNG_RSP message transmitted from the access point controller 121, and broadcasts the modulated/demodulated message to the ATs over the air.

An access terminal that requests a ranging process from the AP 100 and responds to the request will now be described.

FIG. 5 schematically shows a structure of an access terminal AT, and FIG. 6 shows a detailed structure of the AT according to an exemplary embodiment of the present invention.

An AT 200 includes an access terminal controller 21 and a signal transmitting/receiving device 22 as shown in FIG. 5.

The access terminal controller 21 includes a Medium Access Controller (MAC) controller 211, a MAP processor 212 for a ranging process, Downlink (DL) channel condition estimator 213 estimating a downlink channel condition, and a ranging period setting unit 214 setting a ranging period based on the estimated channel condition.

The signal transmitting/receiving device 22 includes a transmitter 221 and a receiver 222 for transmitting and receiving functions. The transmitter 221 processes a modulated/demodulated signal and transmits the processed signal over the air.

The access terminal controller 21 may further include a plurality of devices for transmitting, receiving, and processing data from/to the AP 100, in addition to the MAC controller 211, the MAP processor 212, and the DL condition estimator 213. The devices are well-known to those skilled in the art, and thus further description will not be provided.

As shown in FIG. 6, the MAC controller 211 includes an event generator 211a, a MAP processing controller 211b, a message processor 211c, and a controller 211d. The event generator 211a generates a ranging event at predetermined intervals. The MAP processing controller 211b selects information on a CDMA code, an uplink sub-channel number, and a symbol number according to the generation of the ranging event, transmits the selected information to the MAP processor 212, and controls a MAP process for receiving a RNG_RSP message from the MAP processor 212. The message processor 211c detects a RNG_RSP message that appropriately responds to a ranging request of the corresponding AT from among RNG_RSP messages transmitted to the signal transmitting/receiving device 22. The controller 211d transmits transmission power, timing, and frequency offset included in the appropriated RNG_RSP message to the signal transmitting/receiving device 22 to control transmission power, timing, and frequency offset of the AT 200.

The MAP processor 212 includes a MAP analyzer 212a, and a code transmitter 212b. The MAP analyzer 212a receives and analyzes a UTL-MAP/DL-MAP from the AP 100, and transmits information related to the message transmission/receipt (i.e., Forward Error Correction (FEC) type, a sub-channel, and a symbol) to the signal transmitting/receiving device 22. The code transmitter 212b transmits a CDMA code, a sub-channel number, and a symbol number transmitted from the MAC controller to the signal transmitting/receiving device 22 to control the CDMA code to be transmitted to the AP 100.

The MAC controller 211 and the MAP processor 212 may be jointly called "a ranging request and response processor."

The DL condition estimator 213 estimates a downlink channel condition based on a signal from the AP 100. In particular, it estimates a carrier to interference and noise ratio (CINR) for determining a channel condition.

The UL condition estimator 213 includes a matched filter 213a, a receipt power estimator 213b, and a condition determiner 213c. The matched filter 213a synchronizes pilot channels transmitted from the AP 100, and changes an output value condition depending on a result of a comparison between a pseudo noise (PN) code and a unique PN code. Here, the PN code is provided for detecting synchronization of signals received by the signal transmitting/receiving device 22, and the unique PN code is stored in an access terminal. In other words, the output value becomes a maximum value when the two codes correspond to each other. The receipt power estimator 213b determines that the channels are synchronized when the output value from the matched filter 213a is the maximum value, and estimates a receipt power of a signal received through the pilot channel. In other words, a CINR of the signal received through a synchronized pilot channel is estimated.

The condition determiner 213c determines a downlink interval usage code (DIUC) based on the CINR, and determines a downlink channel condition based on the determined DIUC.

In the wireless portable Internet system, the DL-MAP from the AP 100 may include information on a transmitted message type, information that varies corresponding to a modulation/demodulation type applied to a physical channel for achieving channel synchronization, and a downlink channel descriptor (DCD) that includes a downlink burst profile. The DCD includes a DIUC value that corresponds to a given range of a CINR value, and FEC type information indicating a modulation type and a coding rate. When the AP adds the DIUC value and information on a resource location of the downlink to the DL-MAP and transmits the DL-MAP to the AT, the AT determines a modulation type and a coding rate with reference to the FEC type that corresponds to the DIUC value and then receives downlink data according to the determination result.

FIG. 7 exemplary illustrates DIUC values depending on CINR ranges included in the DCD.

The condition determiner 213a determines a DIUC value from the DCD based on the above-estimated CINR value in each frame, and determines movement of the AT with reference to changes of the DIUC values. For example, when the AT 200 is fixed or does not move, the CINR value estimated in each frame is not greatly changed and therefore the DUIC value is rarely changed. In other words, the condition determiner 213c determines that the AT is not moving when a DIUC value estimated in each frame is varied within a predetermined range, and the condition determiner 213c determines that the AT is moving when the variation of the DIUC values exceeds the predetermined range.

This implies that a downlink channel condition may be determined by checking variation of DIUC values with respect to a single predetermined range. In addition, there may be provided a plurality of ranges to estimate downlink channel conditions.

The ranging period setting unit 214 sets a ranging period according to a downlink channel condition estimated by the downlink condition estimator 213.

In particular, since an uplink channel condition is not greatly influenced according to a downlink channel condition in a TDD-based wireless portable Internet system, the ranging period setting unit 214 reduces CDMA code transmission by reducing a ranging period for controlling the transmission power, timing, and frequency offset of an uplink, when the downlink condition estimator 213 detects no movement in the AT (that is, when the AT is fixed or stops moving). The ranging period setting unit 214, however, increases the CDMA code transmission by increasing the ranging period when the AT moves at high speed. For this dynamic change, the ranging period setting unit 214 may include an initial value setting unit 214a setting an initial value, a condition information storage 214b storing information on a downlink channel condition provided by the downlink condition estimator 213, a comparator 214c comparing stored condition information and information on a current downlink condition, and a period setting unit 214d setting a ranging period with reference to a result of the comparison of the comparator 214c.

The signal transmitting/receiving device 22 broadcasts a RNG-REQ message transmitted from the access terminal controller 21 over the air in accordance with ranging performance, and receives a RNG-RSP from the access point 100 and delivers the received RNG-RSP message to the access terminal controller 21. In addition, the signal transmitting/receiving device 22 receives a signal transmitted from the access point 100 and delivers the transmitted signal to the access terminal controller 21.

Since the above-mentioned AP 100 and signal transmitting/receiving device (12, 22) are already known to a person skilled in the art, no corresponding description will be provided.

Based on the above-described structures, a ranging method according to an embodiment of the present invention will now be described in more detail.

A ranging process will be described with reference to FIG. 8.

FIG. 8 shows a flow of the ranging process according to the embodiment of the present invention.

The resource allocator 112 of the AP 100 transmits a UL-MAP/DL-MAP for data transmission in each AT and the DL-MAP for data receipt in each AT through a broadcasting channel in step S100. The UL-MAP/DL-MAP transmission is performed in each frame.

The MAP processor 212 receives and stores the UP/MAP-DL-MAP transmitted through the signal transmitting/receiving device 22 in step S110, and requests a ranging process by using the DL-MAP stored therein. In particular, the MAP analyzer 212a of the MAP processor 212 analyses the received DL-MAP/UL-MAP, and transmits MAP-related information (particularly an uplink resource and a frame number allocated for the ranging process) to the MAC controller 211 through a MAP information indicator (MAP_Info.indication) in step S120.

When the resource allocator 11b of the AP 100 transmits channel descriptors (including UCD and DCD) that describe characteristics of the physical layer according to characteristics of the uplink/downlink in step S130, the MAC controller 211 of the AT 200 stores a range of the CDMA code for the ranging process and a backoff parameter for avoiding collision on the basis of the channel descriptors transmitted through the signal transmitting/receiving device 22 in step S140.

When the UL-MAP/DL-MAP and UCD/DCD are transmitted and processed for data transmission and receipt, the ranging period setting unit 214 sets a timer with an initial value and starts the timer for the ranging process in step S150. When the timer is started, the event generator 211a is driven to generate a ranging event, and the MAP process controller 211b of the MAC controller 211 selects a given CDMA code, an uplink sub-channel number, and a symbol number, and transmits a ranging code transmission request (RangingCodeTx.request) signal that includes the selected information to the MAP processor 212 in step S160.

The code transmitter 212b of the MAP processor 212 transmits the CDMA code to the AP 100 by writing the CDMA code, uplink sub-channel number, and symbol number that are transmitted in a given time to a given register of the signal transmitting/receiving device 22 in steps S170 and S180. In other words, the signal transmitting/receiving device 22 transmits the CDMA code and the symbol number to the AP 100 by using an uplink radio resource that corresponds to the sub-channel number among the uplink radio resources on the basis of the information written in the given register. The code transmitter 212b of the MAP processor 212 transmits a ranging code transmission confirmation (RangingCodeTx.confirm) signal to the MAC controller 211 in step S190, the ranging code transmission confirmation signal implying completion of the CDMA code transmission.

When the MAC controller 211 receives the RangingCodeTx.confirm signal, the MAC controller 211 stores a current frame number. The MAP process controller 211b of the MAC controller 211 transmits a ranging response receipt start indicator (RngRspRx_Start.indication) to the MAP processor 212 to check whether the AP 100 transmits a response message responding to the ranging process request in step S200.

Meanwhile, the ranging processor 111 of the AP 100 that has received the CDMA code transmitted from the AT 200 controls transmission parameters of the AT 200 based on transmission power, timing, frequency, and offset included in the RNG_REQ message. That is, when values of estimated transmission parameters are great such that the values are far from a predetermined value within a range for accurate data receipt, the ranging processor 111 sets status of the RNG_RSP message as "continue" and transmits a RNG_RSP message including the status of the message and an adjustment value for adjusting the transmission parameters to the AT 200. However, when values of estimated transmission parameters are small, such that the values are included in the predetermined value with the range for accurate data receipt, the ranging processor 111 sets the status of the RNG_RSP message as "success" and transmits a RNG-RSP message including the status of the message and a control value for controlling the transmission parameters to the AT 200.

In addition, the AP 100 transmits a UL_MAP/DL_MAP in each frame in steps S210 to S230, and receives RNG_RSP messages broadcasted from the AP 100 based on the transmitted allocation information in steps S240 and S250.

The MAC controller 211 compares values (CDMA codes, frame numbers, sub-channel numbers, and symbol numbers) in the received RNG_RSP messages and values in the stored MAC controller 211 for the ranging process, and iteratively performs a UP-MAP/DL-MAP transmission and the corresponding RNG_RSP message receipt process until it receives a RNG_RSP message containing values that correspond to the stored values through steps S260 to S300.

If the values in the received RNG_RSP message correspond to values stored in the AT 200, the message processor 211c of the MAC controller 211 determines the received RNG_RSP message as an appropriate RNG_RSP message and transmits a parameter adjustment (PhyParamAdjustment) signal that includes information on transmission powers, timing, and frequency offset of the received RNG_RSP message to the signal transmitting/receiving device 22 in steps 310 and 320. Herein, the AT 200 controls the signal transmitting/receiving device 22 based on the PhyParamAdjustment signal when the status of the RNG_RSP message included in the RNG_RSP message is "continue", and iteratively performs the steps S160 to S320 for transmitting the CDMA code.

The MAC controller 211 terminates the ranging process when the status of the RNG_RSP message included in the RNG_RSP message is "success," and transmits a ranging response receipt stop indicator (RngRngRx_Stop.indication) to the MAC processor 212 to control no further RNG_RSP message to be transmitted thereto. Accordingly, the MAP processor 212 no longer receives a RNG_RSP message from the AP 100 by stopping analyzing of a given portion of a DL_MAP when receiving and processing the DL_MAP in step S330.

In addition, the ranging period setting unit 214 resets a ranging period according to a DL channel condition, and restarts the timer with the reset ranging period and iteratively performs the above-described ranging process, in step S340.

A method for setting an iterative ranging process will now be described.

FIG. 9 and FIG. 10 illustrate ranging period setting processes according to an embodiment of the present invention.

As shown in FIG. 9, the initial value setting unit 214a of the ranging period setting unit 214 sets a ranging period (T_ranging) with a given value in an early stage, in step S400. Here, the ranging period is dynamically set between a maximum period (T_max) and a minimum period (T_min), and an initial ranging period is set to be a mean value (T_mean) of T_max and T_min.

After setting the ranging period as T_mean, the condition information storage 214b receives a current DIUC provided from the DL condition estimator 213 and stores the received current DIUC, in step S410. The DL condition estimator 213 estimates a carrier to interface and noise ratio (CINR) with respect to a signal transmitted from the AP 100 through a pilot channel, searches a DIUC that corresponds to the estimated CINR, and provides the searched value to the ranging period setting unit 214.

The ranging period setting unit 214 stores a current DIUC, and starts the timer after setting it with T_mean in step S420. When T_mean is passed, and thus the timer is terminated in step S430, CDMA code transmission and RNG_RSP message receipt are performed through the MAC controller 211, the MAP processor 212, and the signal transmitting/receiving device 22 such that transmission power, timing, frequency offset of an uplink are controlled, in step S440.

The DL condition estimator 213 estimates a CINR according to a currently received signal, determines a DIUC corresponding to the CINR, and transmits the DIUC to the ranging period setting unit 214, in step S450. The comparator 214c of the ranging period setting unit 214 compares a currently transmitted DIUC and a previous DIUC stored in the condition information storage 214b, in step S460.

As shown in FIG. 10, when the current DIUC and the previous DIUC correspond to each other, the AT 200 is considered to not be moving currently, and thus the period setting unit 214d increases T_ranging by a predetermined time unit (T_unit), in steps S470 and S480. The period setting unit 214d then compares the increased ranging period T_ranging' and T_max in step S490. If the increased ranging period T_ranging' is greater than T_max, the increased ranging period T_ranging' is set to be T_max in step S500. The ranging process returns to step S420 and the timer is started after being set with the increased ranging period T_ranging'.

However, the period setting unit 214d calculates a difference n between the current DIUC and the previous DIUC when they do not correspond to each other, in step S510. Then the period setting unit 214d decreases T-ranging by n times T_unit in step S520. This is to shorten a ranging process interval by reducing the ranging period by n times the unit time to thereby reflect a moving speed of the AT 200 when the AT 200 currently moves from one place to another.

The ranging period setting unit 214 compares the decreased ranging period T_ranging' and T_min in step S530, and sets the decreased ranging period T_ranging' as T_min if the decreased ranging period T_ranging' is less than T_min, in step S540. The ranging process returns to step S320, and the timer is started after being set with the decreased ranging period T_ranging'.

When the timer set with an increased or decreased ranging period according to a DL channel condition is terminated, the above-described ranging process is performed and the ranging period is reset according to the DL channel condition. The foregoing steps are iteratively performed and thus the ranging period is dynamically changed in accordance with the DL channel condition.

When the access terminal is fixed or does not move, the ranging period is increased to reduce code transmission chances to thereby reduce possibility of collision in a contention-based ranging code transmission. This further enhances performance of a wireless communication system.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A ranging method of an access terminal that requests a ranging from an access point through a wireless network and performs the ranging according to a response of the access point, the ranging method comprising:
   a) initializing a ranging period;
   b) setting a timer with the ranging period and starting the timer;
   c) requesting a ranging by transmitting a given ranging code from the access point based on radio resource allocation information provided by the access point when the timer is terminated and thus the ranging period has passed;
   d) receiving a ranging response message from the access point, and controlling transmission power, timing, and frequency offset of an access terminal according to transmission parameters included in the received ranging response message;
   e) estimating a downlink channel condition through which a signal from the access point is transmitted;
   f) resetting the ranging period according to the estimated downlink channel condition; and
   g) iteratively performing from b) to f) according to the reset ranging period.

2. The ranging method of claim 1, wherein e) comprises:
   estimating a carrier to interference and noise ratio (CINR) of the signal transmitted from the access point;
   extracting a downlink channel descriptor included in the radio resource allocation information transmitted from the access point;
   determining a downlink interval usage code (DIUC) that corresponds to the estimated CINR based on the downlink channel descriptor; and
   determining a condition of the downlink channel according to changes of the DIUC.

3. The ranging method of claim 2, wherein:
   a) further comprises estimating a condition of a downlink channel through which a signal is transmitted from the access point, and storing a first DIUC;
   e) comprises estimating a condition of a downlink channel through which a signal is transmitted from the access point, and estimating a second DIUC; and
   f) comprises determining a condition of a downlink channel according to a difference between the first DIUC and the second DIUC.

4. The ranging method of claim 3, wherein f) comprises:
increasing the ranging period by a predetermined value when the first DIUC and the second DIUC correspond to each other;
calculating a difference between the first DIUC and the second DIUC when the first DIUC and the second DIUC do not correspond to each other; and
decreasing the ranging period by a multiplication result of the calculated difference and the predetermined value.

5. The ranging method of any one of claim 1 to claim 4, wherein the ranging method is performed by an access terminal in a wireless portable Internet system.

6. An access terminal requesting a ranging from an access point through a wireless network, and performing the ranging according to a response of the access point, the access terminal comprising:
a transmitting/receiving device transmitting a signal to and receiving a signal from the access point through the wireless network;
a ranging request and response processor requesting ranging by transmitting a ranging code from the access point through the transmitting/receiving device, and controlling at least one of transmission power, timing, and frequency offset of an uplink of the access terminal based on transmission parameters included in a ranging response message transmitted from the access point in response to the request;
a downlink condition estimator estimating a condition of a downlink channel based on the signal received from the access point; and
a ranging period setting unit resetting a ranging period based on the estimated condition of the downlink channel,
wherein the ranging request and response processor requests a ranging from an access point according to the reset ranging period.

7. The access terminal of claim 6, wherein the ranging request and response processor comprises:
an event generator generating a ranging event according to a ranging period set by the ranging period setting unit;
a MAP process controller selecting a ranging code, an uplink sub-channel number, and a symbol number from radio resource allocation information according to the generation of the ranging event;
a message processor detecting a ranging response message appropriate to a ranging request of the corresponding access terminal from ranging response messages transmitted from the transmitting/receiving device;
a medium access control (MAC) controller including a controller that controls transmission power, timing, and frequency offset based on transmission parameters included in the appropriate ranging response message; and
a MAP processor including a MAP analyzer receiving radio resource allocation information from the access point, analyzing the radio information, and transmitting an analysis result to the MAC controller, and a code transmitter transmitting a ranging code including the selected symbol number to an access point through an uplink sub-channel selected by the MAC controller using the transmitting/receiving device.

8. The access terminal of claim 6 or claim 7, wherein the downlink condition estimator comprises:
a receipt power estimator estimating a carrier to interference and noise ratio (CINR) of a signal transmitted from the access point; and
a condition determiner extracting a downlink interval usage code (DIUC) that corresponds to the estimated CINR from the channel descriptor included in the radio resource allocation information, and determining a condition of a downlink channel according to a change of the extracted DIUC.

9. The access terminal of claim 8, wherein the ranging period setting unit comprises:
an initial value setting unit setting a ranging period with a random initial value;
a status information storage receiving a first DIUC from the downlink channel condition estimator and storing the same;
a comparator receiving a second DIUC from the downlink condition estimator and comparing the first DIUC and the second DIUC after a ranging is performed by the ranging request and response processor; and
a period setting unit resetting the ranging period according to a difference between the first DIUC and the second DIUC.

10. The access terminal of claim 9, wherein the period setting unit increases the ranging period by a predetermined value when the first and the second DIUC correspond to each other, and decreases the ranging period by the difference between the first DIUC and the second DIUC when the first DIUC and the second DIUC do not correspond to each other.

11. The access terminal of claim 9, wherein the initial value setting unit sets the initial value to be a mean value between a maximum ranging period and a minimum ranging period.

12. The access terminal of claim 11, wherein the period setting unit sets the reset ranging period to be the maximum ranging period when the reset ranging period is greater than the maximum ranging period, and sets the reset ranging period to be the minimum ranging period when the reset ranging period is less than the minimum ranging period.

* * * * *